Oct. 1, 1963    H. BRUDNEY    3,105,326
DOLLS' EYES
Filed Oct. 20, 1960
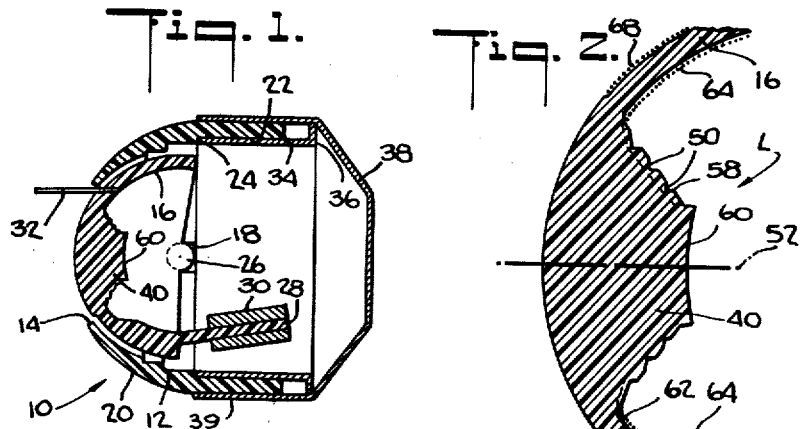
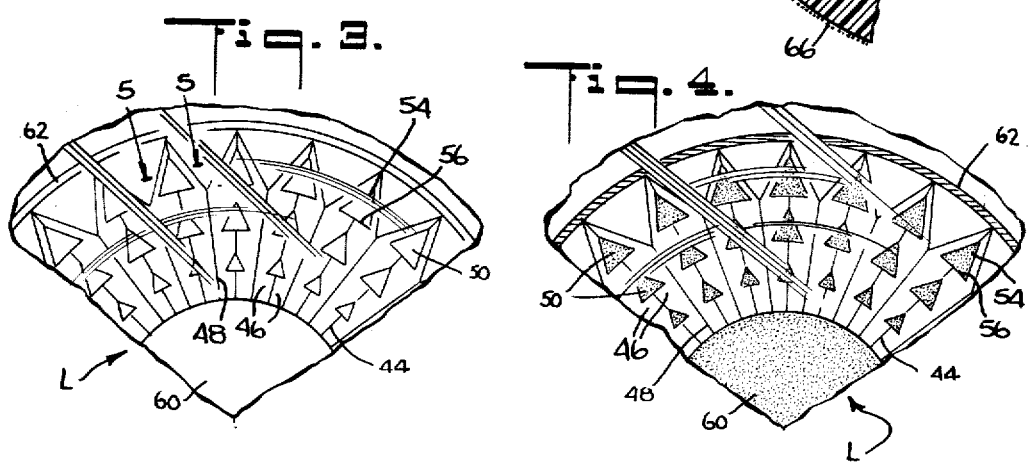
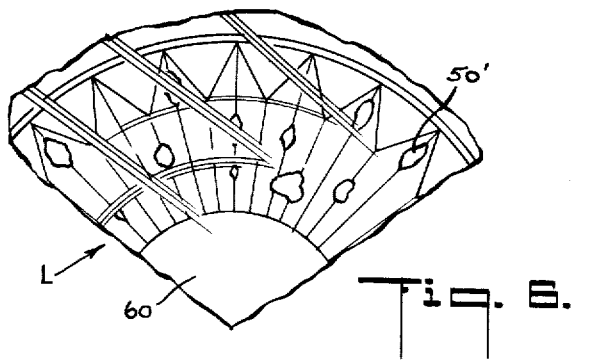
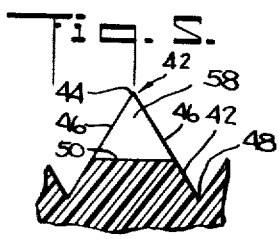
INVENTOR.
HARRY BRUDNEY
BY
ATTORNEYS

United States Patent Office 3,105,326
Patented Oct. 1, 1963

3,105,326
DOLLS' EYES
Harry Brudney, New York, N.Y., assignor to Dollac Corporation, Brooklyn, N.Y., a corporation of New York
Filed Oct. 20, 1960, Ser. No. 63,798
8 Claims. (Cl. 46—169)

This invention relates to dolls' eyes and, more particularly, to a so-called "reflecting" eye such as is shown, for instance, in my United States Letters Patent No. 2,753,660, issued July 10, 1956.

A reflecting eye may be employed as a fixed, i.e. non-sleeping, eye, or in a sleeping eyeset, i.e. a pair of eyes joined for common oscillation, or as an individually movable eye, i.e. a single oscillatable eye which rotates independently of the other eye of a pair of eyes. By way of illustration my invention will be described hereinafter with respect to an individually movable eye, but it is to be understood that it is not so limited.

A reflecting eye is characterized by a lens, i.e. a body, of transparent material, e.g. a synthetic plastic resin, having a central pupil portion the back of which is so shaped and oriented that light rays entering the front of the lens will not be reflected thereby. The space in back of the lens is hollow and dark, having only a limited access to light, and the back wall thereof preferably is dark in color whereby the pupil appears to be black, as in a human eye, and for the same reason.

A reflecting eye further is characterized by an annular iris portion surrounding the central pupil portion, the back of the iris portion being so configured and oriented as to reflect light incident on the lens. Furthermore a reflecting eye usually includes a peripheral portion around the outer rim of the iris portion, the back of said peripheral portion being so contoured and oriented as not to reflect light incident on the lens whereby it, like the pupil portion, will appear to be dark.

It is the custom to shape the back of the annular iris portion so that it includes radial ribs between which lie radial serrations. Indeed all present-day commercial dolls' eyes have iris portions which entirely constitute such radial ribs or serrations. That is to say, the back surface of the iris portion of a current commercial reflecting eye entirely consists of these radial ribs or serrations. Such formation of the iris portion has been deliberately adopted in order to secure maximum reflectivity and brilliance in the iris of a doll's eye and represents an evolution from earlier constructions in which the radial ribs or serrations were spaced from one another by substantial amounts and intermediate constructions such as shown in my aforesaid Letters Patent wherein the radial ribs were quite close to one another.

However, this complete covering of the back surface of the iris portion of a reflecting doll's eye with radial ribs or serrations has given rise to certain drawbacks. Although it has obtained a very desirable brilliance and therefore a humanoid likeness for the iris it has created an iris of extreme regularity in appearance which, due to its very regularity, seems to be artificial, i.e. nonhumanoid. Moreover the intensity of the iris reflection makes the eye glare and appear to be too noticeable and has the further drawback of seeming to make the eye stare rather than look softly. That is to say, the eye has a steely or penetrating appearance; the eye seems to be cold and detracts from the warmth that is desirable for a doll.

It is an object of my invention to provide an improved reflecting doll's eye which overcomes the foregoing drawbacks.

It is another object of my invention to provide an improved reflecting doll's eye which has a more naturalistic, soft and attractive appearance.

It is another object of my invention to provide an improved reflecting doll's eye in which the back of the iris portion is entirely covered by reflecting radial ribs or serrations so as to obtain maximum lightness, except, however, for certain nonradial interruptions to provide a desired humanoid appearance.

It is another object of my invention to provide an improved reflecting doll's eye which includes colored specks, sometimes known as color islands or color flecks, in the iris portion and which in this regard resembles, to some degree, a normal human eye.

Other objects of my invention in part will be obvious and in part will be pointed out hereinafter.

My invention accordingly consists in the features of construction, combinations of elements, and arrangements of parts which will be exemplified in the constructions hereinafter described, and of which the scope of application will be indicated in the appended claims.

In the accompanying drawings, in which I have shown various possible embodiments of my invention, FIG. 1 is a vertical sectional view through a doll's eye the lens of which is constructed in accordance with my invention;

FIG. 2 is an enlarged fragmentary sectional view of the eyeball in the region of the lens;

FIG. 3 is a fragmentary front view of my new lens, the same being illustrated as it appears against a light background;

FIG. 4 is a view similar to FIG. 3, but showing the lens as it appears against a dark background;

FIG. 5 is a sectional view taken substantially along the line 5—5 of FIG. 3; and FIG. 6 is a view similar to FIG. 3 of a doll's eye having a lens embodying a modified form of my invention.

Referring now in detail to the drawings, the reference numeral 10 denotes an individual movable doll's eye assembly of standard construction, except for the lens, the same being of the type shown, for example, in my aforesaid Letters Patent 2,753,660.

The eye assembly includes a molded plastic socket 12 having a front opening 14 through which the eyeball 16 can be seen. The socket which functions as the front half of a casing for the eyeball is open at the rear thereof and is formed with a pair of rearwardly extending grooves 18 which run from the back of the front hemispherical section 20 of the socket to the rear rim of the front casing half. The rear section of the socket, which is of substantially cylindrical tubular shape, is recessed, as at 22, to provide an annular shoulder 24.

The eyeball is made, preferably by molding, of a transparent synthetic plastic material, e.g. cellulose acetate, cellulose acetate butyrate, or an acrylic resin. The plastic may be untinted; however I prefer to impart at least a slight tint thereto. In the absence of tinting the eye will seem to be grey. If a slight blue tint is provided, the eye will appear uncolored. If a heavier blue tint is used, the eye will appear to be blue. If a brown tint is provided the eye will appear to be brown. For tinting I employ standard transparent dyes which conventionally are used in the current fabrication of plastic reflecting doll's eyes.

The eyeball principally constitutes a hemispherical shell and also includes outwardly extending opposed diametrically registered trunnions 26 and a rearwardly extending lower tail 28. A suitable weight, e.g., a strip of lead 30, is secured as by clamping to the tail 28. Optionally an eye lash 32 also is provided, the same either being molded as an intergal part of the eyeball or being inserted in a slit therein subsequently to molding of the eyeball.

The trunnions 26 are received and rotatable in the slots 18.

To retain the eyeball in place in the socket a ring of metal or plastic is utilized having a cylindrical portion 34 which is snugly accommodated in the recess 22 as far as the shoulder 24. Said ring has an outwardly extending annular flange portion 36 which is spaced from the back rim of the socket 20 as shown in FIG. 1. The cylindrical portion 34 reinforces the eye socket 20 as well as providing means for securely retaining the trunnions 26 in place.

The back of the eye socket is closed by a rear casing half 38 having a forwardly extending tubular portion 39 which is a snug fit on the outer surface of the rearwardly extending tubular section of the socket. Although not necessary, it is desirable that the inner portions of the casing which are in the line of sight through the pupil of the eyeball, be colored dark, e.g. black. These inner surfaces constitute the inner surface of the cylindrical portion 34 and the inner surface of the back of the rear casing half 38.

It will be appreciated that the construction of the doll's eye assembly as above described is entirely conventional and forms no part of my invention, having been detailed only in order to set forth the environment in which my invention is used. My invention resides in the physical configuration of the lens portion itself.

The lens portion, denoted by the reference numeral L, is at the center of the hemispherical part of the transparent eyeball and consists of a protuberant formation 40 on the rear surface. Said formation is approximately in the shape of the frustum of a cone. That is to say, the envelope (circumscribing shape) of the actual configuration of the protuberance is the frustum of a cone, although the specific geometric configuration of said formation does not include any true conic surface.

More specifically, the lens L includes an iris portion constituting a frustum of a multifaceted pyramid which is formed by providing a large number of slanted radial ribs 42 on the sides of the formation. The bases of the ribs are contiguous so that each adjacent pair of ribs defines a radial serration. Said ribs are of triangular cross-section (see FIG. 5) and, therefore, of prismatic contour with the apices 44 of the prisms constituting slant heights on the surface of the frustoconical envelope which may be considered to circumscribe the formation.

The sides 46 of each radial prismatic rib are symmetrically angularly disposed on opposite sides of the apex 44 included between them. The included angle between the pair of narrow side surfaces 46 forming a prismatic rib is about 90° so that light incident on the front of the lens L and internally striking the side surfaces 46 of a rib will be substantially totally internally reflected to strike the other side surface of the rib, then across to a narrow side surface of a diameterically opposed prismatic rib, then to the other side surface of said oposite rib and finally back out through the front of the lens. In this way the rear surface of the lens is shaped so as to act as light-gathering mechanism which will reflect back out substantially all of the light that strikes the narrow radial side surfaces of the formation whereby the sides of said frusto-pyramidal formation 40 will shine brightly by reflected light, the radial slanting apices 44 of the ribs and the radial slanting bases 48 of the serrations between the ribs being distinctly and clearly visible as discontinuities in the reflecting side surfaces so that the frusto-pyramidal formation is visible from the front of the lens as an annular illuminated iris zone having radiating lines corresponding to the apices 44 and the bases 48.

It will be observed that the bases of the prismatic ribs touch one another so that they substantially fill the annular front projection over which the ribs extend. Due to the substantially total reflecting arrangement of the narrow side surfaces 46 of the prismatic ribs, the lens is quite light, i.e. brilliant, and in this respect humanoid. However, as pointed out earlier, this high reflectivity makes the eye too staring, hard and piercing and too uncomfortable to look at in a doll.

Pursuant to my present invention I have reduced the intensity of reflecting iris glare in a natural appearing manner which makes the eye softer, more comfortable to view and more assuring for a child. I have done this by providing non-reflecting areas, i.e. islands, spots or flecks, at various parts of the frusto-conical iris portion of the formation 40. These islands are formed by including surfaces 50 of relatively small area (small with respect to the total iris area) on the back of the serrated sides of the formation 40 which surfaces 50 are approximately normal to the central optical axis, i.e. the axis of symmetry 52, of the lens portion L. Said axis likewise is the axis of symmetry of the frusto-conical envelope or, more specifically, of the frusto-pyramidal formation 40. It is not essential that said surfaces 50 be precisely 90° to the aforesaid axis of symmetry and indeed in the illustrated form of my invention said surfaces are inclined at an angle of 75°; however, in general it is to be observed that too great a deviation (more than about 60°) from perpendicularity is not desirable.

As noted above the surfaces 50 may be located anywhere at all within the annular iris area which is defined by the front projection of the frusto-pyramidal portion of the lens formation 40. For instance, any one of such surfaces may be located wholly within a single narrow side surface 46 of a rib or wholly within a single rib (including portions of both sides) or may bridge two or more ribs or may bridge one or more serrations. In the embodiment of my invention illustrated in FIGS. 2–5, I have shown each surface 50 located wholly within a single prismatic rib, i.e. bridging the associated pair of side surfaces 46 of single ribs.

More particularly, referring for instance to FIGS. 2–4, each prismatic rib is formed with three such 75° substantially flat smooth surfaces 50. Due to the symmetrical triangular cross-section of the prismatic ribs, the front projection of each surface 50 is an isosceles triangle 54. There are, by way of example, three such triangles formed in each prismatic rib. Inasmuch as in the eye shown all of the surfaces 50 extend to like distances away from the bases of the prismatic ribs and because the height of the prismatic ribs increases in a direction away from the center of the lens, the triangular islands 54 are progressively larger as their distance from the center of the lens increases. The side 56 of each triangle closest to the center of the lens is defined by the front projection of a wall 58 which is substantially parallel to the axis of symmetry 52 in order that the space in back of each of the islands 50 be left substantially unobstructed.

Due to the orientations of the smooth surfaces 50, i.e. less than 60° to the axis of symmetry 52, light entering the front of the lens will to a substantial degree not be reflected by the surfaces 50 but will pass on into the interior of the casing; accordingly, the surfaces 50 will appear to be black or dark and hence will give the effect of dark flecks in the otherwise substantially totally reflecting annular iris surface of the frusto-pyramidal formation 40 of the lens L.

It is simplest from a die manufacturing point of view to make the surfaces 50 triangular and on every rib, as has been described, since these shapes can be provided with ease by milling the hobbing die. The regularity of the ensuing flecks in the eye (caused by the isosceles shape of the triangles, the symmetry of the triangles on the apices of the ribs and the presence of the triangles in the same location on every rib) is not unduly noticeable or undesirable; however it is within the scope of my invention to have said islands less regularly shaped and arranged and in FIG. 6, for example, I have shown several such islands 50' of irregular contour, size and location. Some of them bridge a prismatic serration rather than a prismatic rib and others bridge at least three surfaces 46.

In FIG. 3 the lens is shown as it appears when viewed from the front with the back surface thereof exposed to light, i.e. not in front of a dark background. The triangular islands 54 are, under such circumstances, barely distinguishable from the remainder of the frusto-pyramidal annular iris portion since the illumination of the islands from the back is substantially equal to the illumination of the prismatic ribs from the front. However when the eyeball is placed over a dark background as shown in FIG. 4 the contrast between the islands and the prismatic serrations is immediately noticeable. The prismatic serrations maintain their substantial degree of illumination, brilliance and lightness due to reflection of light entering the front of the eyeball while the islands become dark since no light is reflected thereby and the viewer sees only the dark background behind the islands.

The center of the annular frusto-pyramidal iris portion is formed to provide a smooth nonreflecting surface 60 which, as described in my issued United States Letters Patent 2,753,660, is rearwardly concave. However the specific contour of this surface is not a feature of my invention except that said surface 60 should be nonreflective; for example said surface may be flat or rearwardly convex or even painted a dark color although the latter is not necessary.

It thus will be seen that the lens L essentially comprises a transparent formation including at the back surface a central, preferably circular, surface 60 which is non-reflective and, therefore, will appear black when viewed against a dark background (see FIG. 4) thereby forming the pupil of the doll's eye and that the back surface of the lens also includes the frusto-pyramidal portion which when viewed from the front against a dark background is of annular iris configuration circumscribing the pupil and reflecting light brilliantly with the provision of radial striated lines (the apices 44 and bases 48), and the interposition within this bright iris area of the flecks 54 or 50' which are dark (substantially non-reflective) when viewed against a dark background.

Where the flecks are, as shown in FIG. 4, of progressively greater area in proportion to their distance from the pupil, a desirable effect is secured, to wit, that of gradually darkening the lens of the doll's eye toward the periphery of the iris. This creates an illusion of naturalness which until the present time was unobtainable in doll's eyes. It should be pointed out that the flecks are quite small in area with relation to the area of the annular iris portion and unless viewed carefully or unless deliberately made larger, tend to blend together to give the peripheral darkening just mentioned, as well as to create a mottled effect which desirably lessens the steely glare of reflected light from the prismatic ribs.

The lens L may, if desired, further include a substantially flat annulus 62 peripherally circumscribing the large end (forward base) of the frusto-pyramidal formation 40. The surface of said annulus is at approximately 90° (less than 60°) to the axis of symmetry 52 so that this surface is nonreflecting. If said surface is left uncovered, i.e. unpainted, it will, when viewed against a dark background, provide a dark ring around the iris of the doll's eye. However I prefer, in order to obtain a more realistic appearance, to coat said annulus 62 with paint, lacquer or the like of a desirable hue, e.g. of the same color as, but darker than, the tint imparted to the plastic lens. This layer of paint is indicated by the dotted line 64 in FIG. 2 and not only covers the annulus 62, but, for convenience, all of the interior surface of the eyeball, except the formation 40 which is protected, as by a mask, during the painting operation. The outer (front) surface of the eyeball radially outward of the formation 40 is painted a lighter color, the portion below the lens and up to the ends of the lash being painted white and being indicated by the dotted line 66, while the portion above the lens and ends of the lash is painted flesh color as indicated by the dotted line 68 to represent an eyelid.

It will thus be seen that I have provided dolls' eyes which achieve the several objects of my invention and are well adapted to meet the conditions of practical use.

As various possible embodiments might be made of my above invention, and as various changes might be made in the embodiments above set forth, it is to be understood that all matter herein set forth or shown in the accompanying drawings is to be interpreted as illustrative and not in a limiting sense.

Having thus described my invention, I claim as new and desire to secure by Letters Patent:

1. In a reflecting doll's eye, an eyeball having a forwardly convex front portion and adapted to be mounted in front of a dark background, said eyeball including a symmetrical lens of transparent material comprising a rearwardly extending rearwardly tapering frustum including on the tapering rear sides thereof radially oriented substantially totally internally reflecting narrow surfaces, said surfaces being in part interrupted by substantially flat smooth surfaces that are approximately normal to the axis of symmetry of the lens to form nonreflecting areas, each non-reflecting area having at least a peripheral portion thereof level with the rear side of a reflecting surface whereby the totally reflecting surfaces define a bright annulus throughout which dark areas corresponding to the non-reflecting areas are dispersed.

2. In a reflecting doll's eye, an eyeball having a forwardly convex front portion and adapted to be mounted in front of a dark background, said eyeball including a symmetrical lens of transparent material comprising a rearwardly extending rearwardly tapering frustum including on the tapering rear sides thereof radially oriented prismatic substantially totally internally reflecting ribs, the rear surfaces of said ribs being in part interrupted by substantially flat smooth surfaces that are approximately normal to the axis of symmetry of the lens to form non-reflecting areas, each non-reflecting area having at least a peripheral portion thereof level with the rear side of a rib whereby the totally reflecting ribs define a bright annulus throughout which dark areas corresponding to the non-reflecting areas are dispersed.

3. In a reflecting doll's eye, an eyeball having a forwardly convex front portion and adapted to be mounted in front of a dark background, said eyeball including a symmetrical lens of transparent material comprising a rearwardly extending rearwardly tapering frustum including on the tapering rear sides thereof radially oriented prismatic substantially totally internally reflecting serrations, the rear surfaces of said serrations being in part interrupted by substantially flat smooth surfaces that are approximately normal to the axis of symmetry of the lens to form nonreflecting areas, each non-reflecting area having at least a peripheral portion thereof level with the rear side of a reflecting serration whereby the totally reflecting serrations define a bright annulus throughout which dark areas corresponding to the non-reflecting areas are dispersed.

4. An eye as set forth in claim 1 wherein the non-reflecting areas are of triangular configuration.

5. An eye as set forth in claim 2 wherein the non-reflecting areas are located at the apices of the ribs.

6. An eye as set forth in claim 1 wherein the non-reflecting areas extend across adjacent reflecting narrow surfaces.

7. An eye as set forth in claim 2 wherein the non-reflecting areas extend across adjacent ribs.

8. An eye as set forth in claim 3 wherein the non-reflecting areas extend across adjacent serrations.

References Cited in the file of this patent

UNITED STATES PATENTS

| | | |
|---|---|---|
| 1,289,643 | Burlich | Dec. 31, 1918 |
| 1,740,675 | Wilhelm | Dec. 24, 1929 |
| 1,763,312 | Marcus | June 10, 1930 |
| 2,753,660 | Brudney | July 10, 1956 |
| 2,966,005 | Anderson | Dec. 27, 1960 |

FOREIGN PATENTS

| | | |
|---|---|---|
| 522,860 | Italy | Apr. 12, 1955 |

UNITED STATES PATENT OFFICE
CERTIFICATE OF CORRECTION

Patent No. 3,105,326                          October 1, 1963

Harry Brudney

It is hereby certified that error appears in the above numbered patent requiring correction and that the said Letters Patent should read as corrected below.

In the grant, lines 1 to 3, for "assignor to Dollac Corporation, of Brooklyn, New York, a corporation of New York," read -- assignor, by mesne assignments, to Jacoby-Bender, Inc., of Woodside, New York, a corporation of New York, --; line 12, for "Dollac Corporation, its successors" read -- Jacoby-Bender, Inc., its successors --; in the heading to the printed specification, lines 3 to 5, for "assignor to Dollac Corporation, Brooklyn, N. Y., a corporation of New York" read -- assignor, by mesne assignments, to Jacoby-Bender, Inc., Woodside, N. Y., a corporation of New York --.

Signed and sealed this 5th day of May 1964.

(SEAL)
Attest:

ERNEST W. SWIDER                          EDWARD J. BRENNER

Attesting Officer                          Commissioner of Patents